(12) United States Patent
Hirota

(10) Patent No.: US 6,866,242 B2
(45) Date of Patent: Mar. 15, 2005

(54) PROPORTIONAL VALVE

(75) Inventor: Hisatoshi Hirota, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 37 days.

(21) Appl. No.: 10/653,233

(22) Filed: Sep. 3, 2003

(65) Prior Publication Data

US 2004/0046140 A1 Mar. 11, 2004

(30) Foreign Application Priority Data

Sep. 5, 2002 (JP) ...................... 2002-259474

(51) Int. Cl.$^7$ ............................................. F16K 31/06
(52) U.S. Cl. ............................. 251/129.07; 251/129.17
(58) Field of Search .................. 251/129.07, 129.17, 251/129.08, 129.15, 129.18

(56) References Cited

U.S. PATENT DOCUMENTS

| | | | | |
|---|---|---|---|---|
| 5,020,771 A | * | 6/1991 | Nakatsukasa et al. | 251/30.02 |
| 5,277,399 A | * | 1/1994 | McCabe | 251/129.18 |
| 6,604,726 B2 | * | 8/2003 | Kumar | 251/129.16 |
| 2001/0032947 A1 | | 10/2001 | Freisinger et al. | 251/30.03 |

FOREIGN PATENT DOCUMENTS

| EP | 0 769 645 | 4/1997 |
|---|---|---|
| JP | 2001-317652 | 11/2001 |

OTHER PUBLICATIONS

Patent Abstracts of Japan, Publication Number 2002–130870, dated May 9, 2002./Discussed in the specification.

* cited by examiner

Primary Examiner—Steven O. Douglas
(74) Attorney, Agent, or Firm—Westerman, Hattori, Daniels & Adrian, LLP

(57) ABSTRACT

The object of the present invention is to provide a proportional valve which does not open or close by itself and is free of internal leakage. A valve element is formed integrally with a piston having a cross-sectional area equal to that of a valve hole constituting a valve seat, and a diaphragm having an outer peripheral portion secured to a body by a holder is disposed in contact with a pressure-receiving end face of the piston. The diaphragm is mounted in a displaced state such that when the valve element is seated on the valve seat, the pressure receiving area of the diaphragm is at a maximum and is equal to that of the valve element. Change in the pressure receiving area of the valve element corresponding to the lift amount thereof is canceled out by change in the pressure receiving area of the diaphragm corresponding to the amount of displacement thereof, thus preventing the valve from opening or closing by itself due to the difference between the pressure receiving areas. Also, a sliding portion of the piston is shut off by the diaphragm, whereby internal leakage can be completely prevented.

6 Claims, 7 Drawing Sheets

US 6,866,242 B2

PROPORTIONAL VALVE

CROSS-REFERENCES TO RELATED APPLICATIONS, IF ANY

This application claims priority of Japanese Application No. 2002-259474 filed on Sep. 5, 2002 and entitled "Proportional Valve".

BACKGROUND OF THE INVENTION (1) Field of the Invention

The present invention relates to a proportional valve, and more particularly, to a solenoid-operated proportional valve whose lift amount varies in proportion to a value of current supplied to the solenoid.

(2) Description of the Related Art

As a refrigerating cycle of an automotive air conditioning system, for example, there has been known a configuration wherein high-temperature, high-pressure gaseous refrigerant compressed by a compressor is condensed or cooled by a condenser or a gas cooler, the condensed or cooled refrigerant is turned into low-temperature, low-pressure refrigerant by a pressure reducing device, the low-temperature refrigerant is evaporated by an evaporator, the evaporated refrigerant is separated into gas and liquid by an accumulator, and the separated gaseous refrigerant is returned to the compressor. In such systems, a solenoid-controlled proportional valve capable of controlling a valve lift thereof in proportion to a value of current supplied thereto from outside is used as the pressure reducing device.

Conventional proportional valves are generally constructed such that a valve element which lifts in proportion to a value of current supplied to a solenoid moves together with a piston which has a cross-sectional area equal to the valve hole of a valve seat and which is applied with a pressure on an upstream side of the valve element at an end face thereof opposite the valve element. Accordingly, pressures acting upon the valve element and the piston are of the same magnitude but opposite in direction and thus are canceled out. The valve element can therefore be moved only by an urging force exerted by the solenoid, regardless of the magnitude of the pressure on the upstream side of the valve element.

The piston is so constructed as to move together with the valve element while receiving the pressure on the upstream side of the valve element at one end face thereof and the pressure on the downstream side of the valve element at the other end face thereof. Accordingly, a sliding portion of the piston between its both end faces needs to be hydraulically sealed. For such sealing, a labyrinth seal is used (see Japanese Unexamined Patent Publication No. 2002-130870 (FIG. 1), for example). The labyrinth seal is low in sliding resistance and thus is often used as a method for sealing a piston of which the back pressure is to be canceled.

In conventional proportional valves, however, it is generally known that the pressure receiving area of the valve section varies depending upon the lift amount of the valve element, while the pressure receiving area of the piston is fixed. Thus, the back pressure cancellation fails to function properly, giving rise to a problem that the valve element moves by itself to open or close due to the difference between the pressure receiving areas.

Also, the piston has a labyrinth seal for sealing between the space on the upstream side of the valve section and the space on the downstream side of same. Since the labyrinth seal is unable to provide perfect seal, however, the refrigerant leaks from the labyrinth seal when the valve section is fully closed, for example, giving rise to a problem that the controllability lowers due to such internal leakage.

SUMMARY OF THE INVENTION

The present invention was created in view of the above circumstances, and an object thereof is to provide a proportional valve which does not open or close by itself and is free of internal leakage.

To solve the above problems, the present invention provides a proportional valve having a valve element whose lift amount varies in proportion to a current value. The proportional valve is characterized by comprising a piston arranged on one side of a valve seat opposite the valve element and movable together with the valve element, the piston receiving a pressure equal to a fluid pressure applied to the valve element from an upstream side thereof in a valve closing direction, to urge the valve element in a valve opening direction, and a diaphragm arranged at a pressure receiving portion of the piston, for varying a pressure receiving area of the pressure receiving portion in accordance with the lift amount of the valve element.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereinafter described in detail with reference to the drawings, wherein the invention is applied, by way of example, to a pressure reducing device of an automotive air conditioning system.

Figure 1:
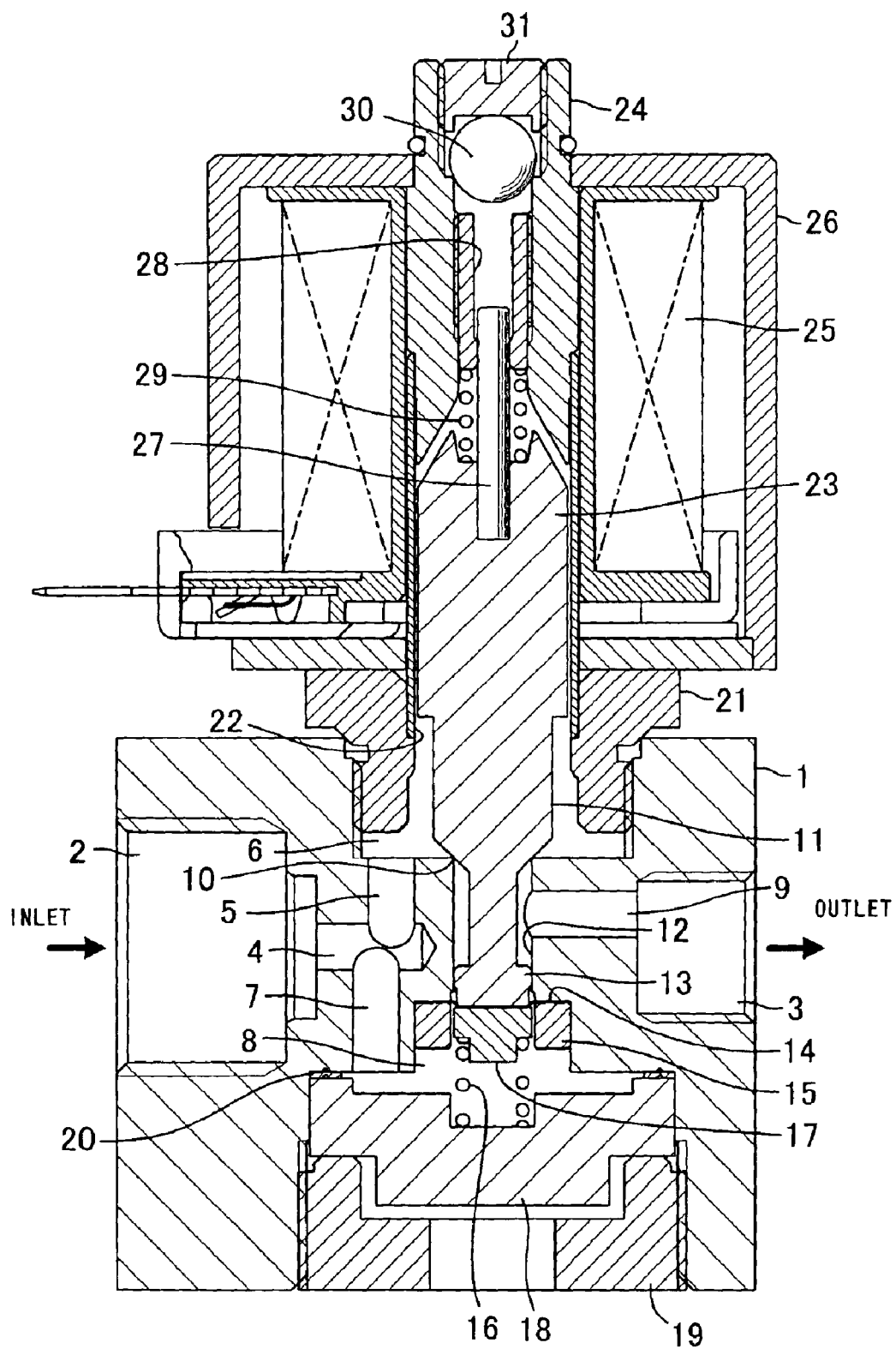
FIG. 1 is a longitudinal sectional view showing a de-energized state of a proportional valve according to a first embodiment.
Figure 2:
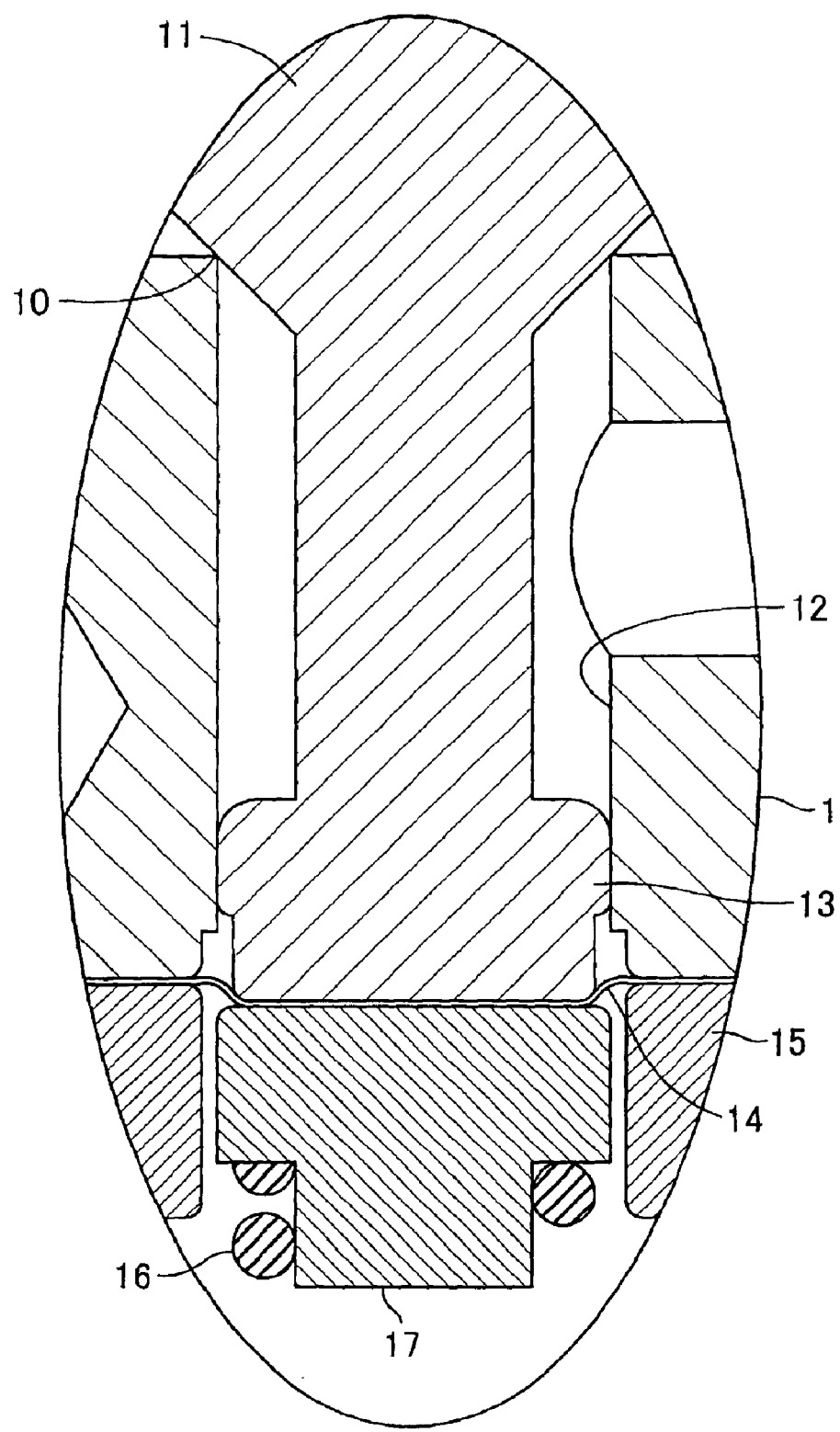
FIG. 2 is an enlarged sectional view of a principal part appearing in FIG. 1.
Figure 3:
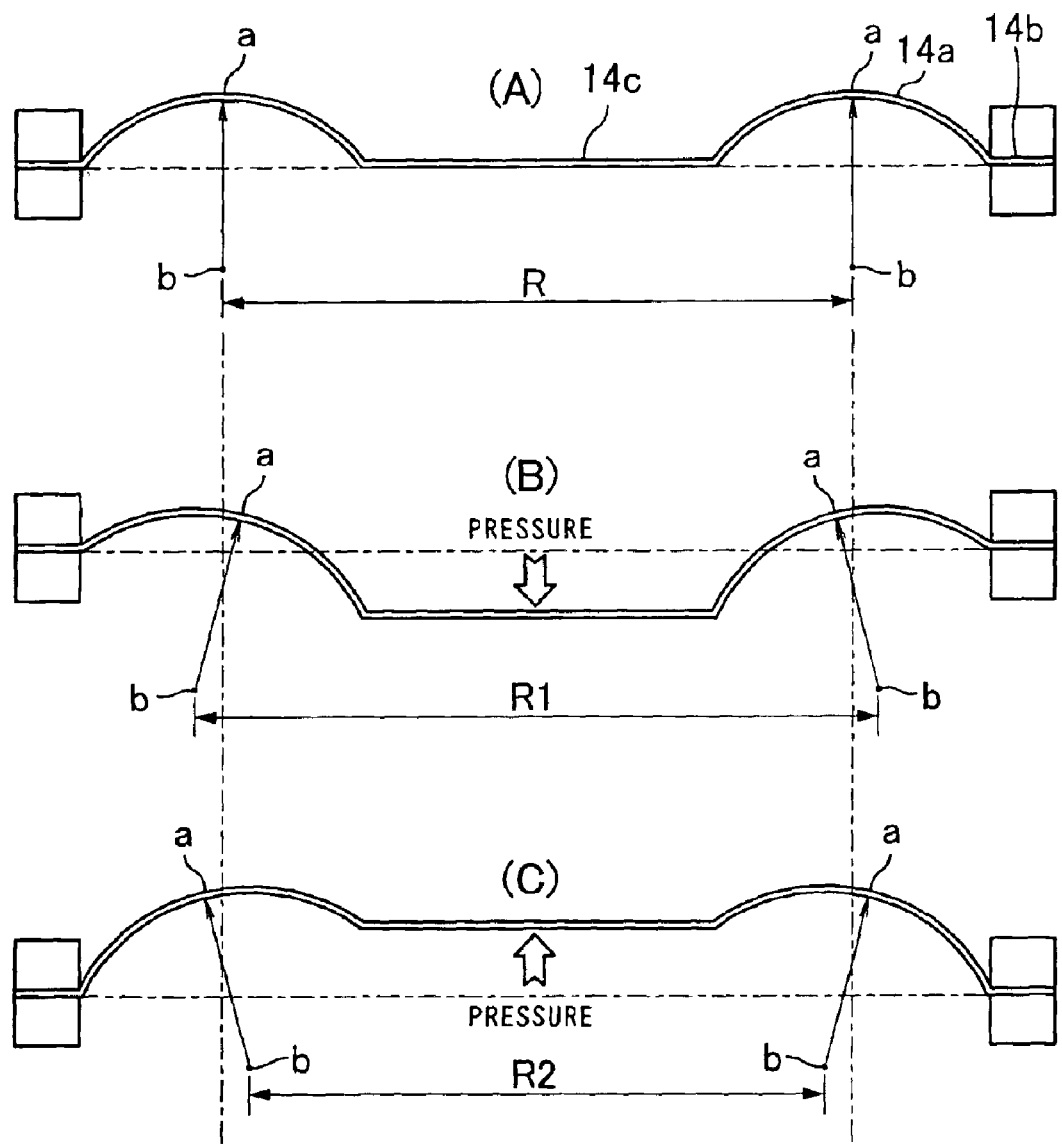
FIG. 3 is a diagram illustrating change in pressure receiving area of a diaphragm.
Figure 4:
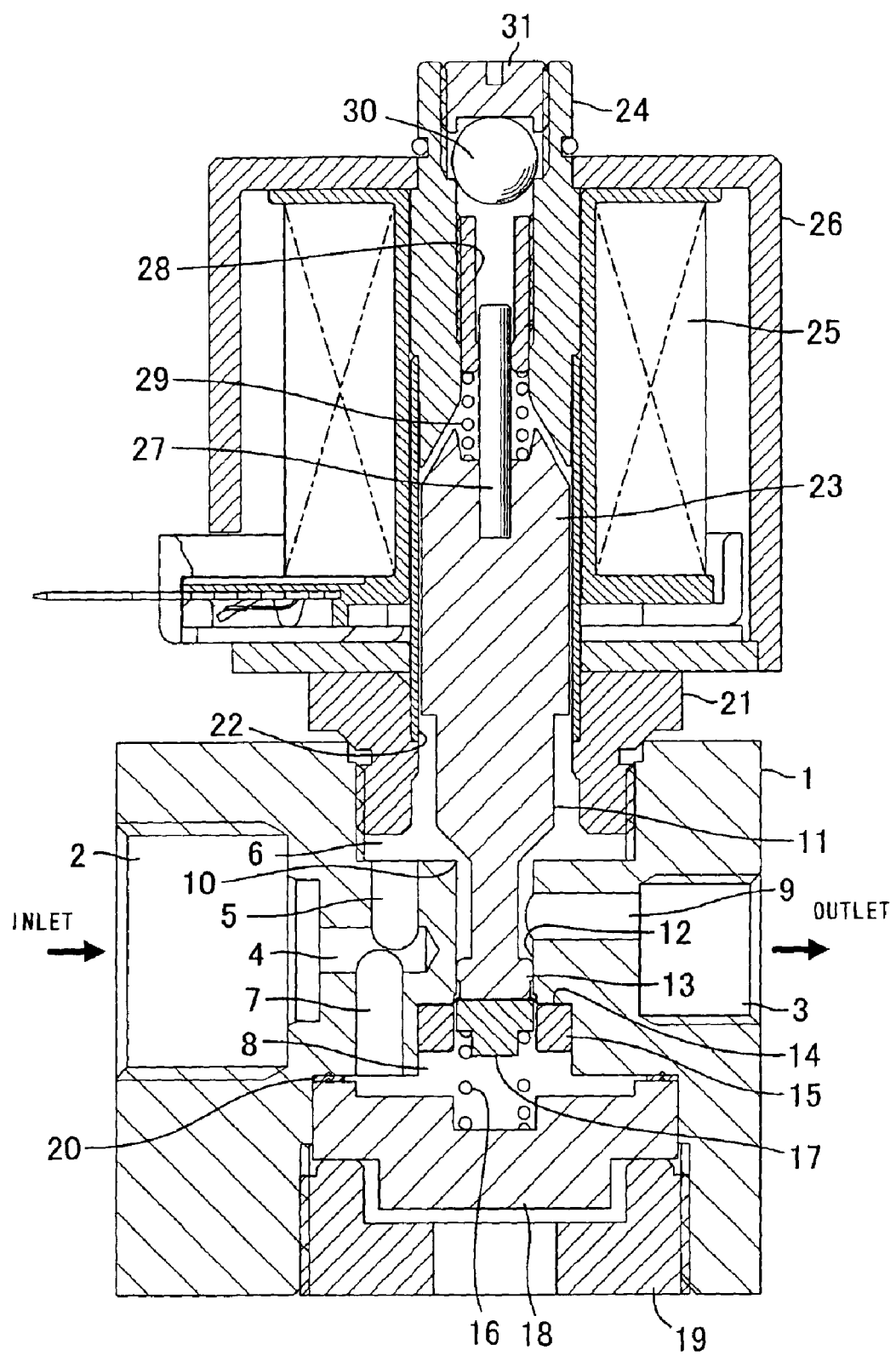
FIG. 4 is a longitudinal sectional view showing an energized state of the proportional valve of the first embodiment.

FIG. 1 is a longitudinal sectional view showing a de-energized state of a proportional valve according to a first embodiment, FIG. 2 is an enlarged sectional view of a principal part appearing in FIG. 1, FIG. 3 is a diagram illustrating change in pressure receiving area of a diaphragm, and FIG. 4 is a longitudinal sectional view showing an energized state of the proportional valve of the first embodiment.

A proportional valve according to the present invention has an inlet port 2 for receiving high-pressure refrigerant and an outlet port 3, the ports being formed in respective side faces of a body 1. The inlet port 2 is connected to a common passage 4 communicating through a passage 5 with a first chamber 6, into which the refrigerant is introduced, and also communicating through a passage 7 with a second chamber 8. The first chamber 6 communicates with the outlet port 3 through a valve hole and a passage 9, both formed in the body 1. An inner peripheral edge at an upper open end of the valve hole opening to the first chamber 6 constitutes a valve seat 10. A valve element 11 is arranged so as to face the valve seat 10 from an upstream side and is movable toward the valve seat 10 into contact therewith and away from same. The valve element 11 is formed integrally with a piston 13, thus constituting a one-piece body, and the piston 13 is slidably received in a cylinder 12 formed on the extension of the valve hole in alignment therewith. A lower end of the cylinder 12 is closed with a diaphragm 14 of which the outer peripheral edge portion is secured to the body 1 by an annular holder 15 press-fitted in the body 1. The diaphragm 14 has an upper surface, as viewed in the figures, disposed in contact with a lower end face of the piston 13, and has a lower surface disposed in contact with a stopper 17 urged by a spring 16. The second chamber 8 is defined by a plug 18 which is pressed against the body 1 with a gasket 20 therebetween by a stopper 19 screwed into the body 1.

A solenoid is attached to an upper part of the body 1 with a flange 21 interposed therebetween. The solenoid includes a sleeve 22 having a lower end portion fitted into the flange 21, a plunger 23 formed integrally with the valve element 11 and axially movably arranged in the sleeve 22, a cylindrical core 24 fitted into an upper end portion of the sleeve 22, an electromagnetic coil 25 arranged around the sleeve 22, and a yoke 26 surrounding the coil 25. A shaft 27 has a lower end portion securely fitted into the plunger 23 along the axis thereof, and has an upper end portion supported by an adjusting screw 28 screwed in the hollow of the core 24. Since the piston 13 formed at the lower end of the plunger 23 integrally therewith is supported by the cylinder 12, the valve lift characteristic relative to the value of electric current supplied to the electromagnetic coil 25 can be prevented from developing a hysteresis attributable to resistance to the sliding motion of the plunger 23 along the inner wall of the sleeve 22 when the valve element 11 opens or closes. Between the adjusting screw 28 and the plunger 23 is arranged a spring 29 having a larger spring force than the spring 16 disposed in the second chamber 8 and urging the plunger 23 and the valve element 11 integral therewith in the valve closing direction. The urging force of the spring 29 is adjusted by a distance for which the adjusting screw 28 is screwed in. The hollow of the core 24 is closed at an upper end with a ball-shaped stop plug 30 and a locking screw 31.

A characteristic of the diaphragm 14 with which the piston 13 is disposed in contact will be now described with reference to FIG. 3. The diaphragm 14 comprises a thin circular sheet made of rubber, resin or metal, and has an annular bent portion 14a with an arcuate sectional form to permit displacement thereof in a direction perpendicular to its flat surface. As seen from FIG. 3 showing a section of the diaphragm 14 taken along a line passing through the center thereof, the diaphragm 14 is fixed at its peripheral edge portion 14b. Thus, when the diaphragm is applied with no pressure, its central portion 14c is on a level with the peripheral edge portion 14b, as shown in part (A). However, when the diaphragm is applied with pressure from above, as viewed in the figure, the central portion 14c is displaced downward, as shown in part (B), and when the diaphragm is applied with pressure from below, the central portion 14c is displaced upward, as shown in part (C).

Thus, the diaphragm 14 is displaceable by pressure applied thereto, and in the state (A) in which no pressure is applied, the diaphragm has an effective pressure-receiving area equal to the area of a circle with a diameter R connecting diametrically opposite centers b of curvature, which represent the base points of the radii of curvature at respective center points a of the bent portion 14a. When the diaphragm 14 is applied with pressure from above, as viewed in the figure, the center points a of the bent portion 14a shift inward, and accordingly, the centers b of curvature shift outward. In this case, the diaphragm 14 has a larger effective pressure-receiving area equal to the area of a circle with a diameter R1 (>R). Conversely, when the diaphragm 14 is applied with pressure from below, as viewed in the figure, the center points a of the bent portion 14a shift outward and thus the centers b of curvature shift inward. In this case, the diaphragm 14 has a smaller effective pressure-receiving area equal to the area of a circle with a diameter R2 (<R). Namely, the effective pressure-receiving area of the diaphragm 14 varies depending upon the amount of displacement of the central portion 14c applied with pressure.

The effective pressure-receiving area of the valve element 11 also varies depending upon the lift amount. Specifically, when the valve element 11 is seated on the valve seat 10, the valve element has an effective pressure-receiving area corresponding to the diameter of the valve hole. As the valve element 11 lifts and moves farther from the valve seat 10, the effective pressure-receiving area decreases. According to the present invention, change in the effective pressure-receiving area of the valve element 11 is canceled out by the diaphragm 14 whose effective pressure-receiving area also varies in like manner.

Specifically, as shown in detail in FIG. 2, the diaphragm 14 is mounted in such a manner that when the valve element 11 is seated on the valve seat 10, the diaphragm 14 is in the state (B) shown in FIG. 3, in which the effective pressure-receiving area is the largest, that is, the central portion 14c is displaced on the side opposite the bent portion 14a with the bent portion 14a directed toward the piston 13. At this time, the effective pressure-receiving area of the diaphragm 14 is of course made equal to that of the valve element 11 seated on the valve seat 10. As the valve element 11 in this state lifts from the valve seat 10 and its effective pressure-receiving area decreases, the effective pressure-receiving area of the diaphragm 14 also varies in a decreasing direction.

In the proportional valve constructed as described above, when the electromagnetic coil 25 is de-energized and no refrigerant is introduced into the inlet port 2, the valve element 11 is seated on the valve seat 10 by the spring 29 of the solenoid and the proportional valve remains closed.

As high-pressure refrigerant is introduced from a condenser or a gas cooler into the inlet port 2, the refrigerant is supplied evenly to the first and second chambers 6 and 8. In this case, since the effective pressure-receiving area of the valve element 11 is equal to that of the diaphragm 14, the valve element 11 never opens by itself due to the pressure of the introduced refrigerant and thus the proportional valve remains closed.

Subsequently, when the electromagnetic coil 25 is energized, the plunger 23 is attracted toward the core 24 for a distance corresponding to the value of current supplied to the coil 25, and accordingly, the valve element 11 lifts for the same distance, bringing the proportional valve to a state shown in FIG. 4. In this state, the refrigerant introduced to the inlet port 2 is supplied to the first chamber 6 through the passages 4 and 5, as well as to the second chamber 8 through the passages 4 and 7. The pressures in the first and second chambers 6 and 8 are equal and the effective pressure-receiving areas of the valve element 11 and diaphragm 14 are nearly equal and receive the same pressure in opposite directions, whereby the influence exerted on the valve element 11 by the refrigerant pressure is canceled out. Consequently, the valve element 11 operates depending solely on the value of current supplied to the solenoid and the spring forces of the springs 16 and 29. Namely, since the spring forces of the springs 16 and 29 are set beforehand, the lift amount of the valve element 11 is determined by the value of current supplied to the solenoid.

The proportional valve of which the lift amount of the valve element 11 has been set in this manner permits the refrigerant supplied to the first chamber 6 to pass through the gap between the valve seat 10 and the valve element 11 and the passage 9 to the outlet port 3. When passing through the gap between the valve seat 10 and the valve element 11, the high-temperature, high-pressure refrigerant adiabatically expands and turns into low-temperature, low-pressure refrigerant, which is then supplied to the evaporator of the refrigerating cycle.

Figure 5:
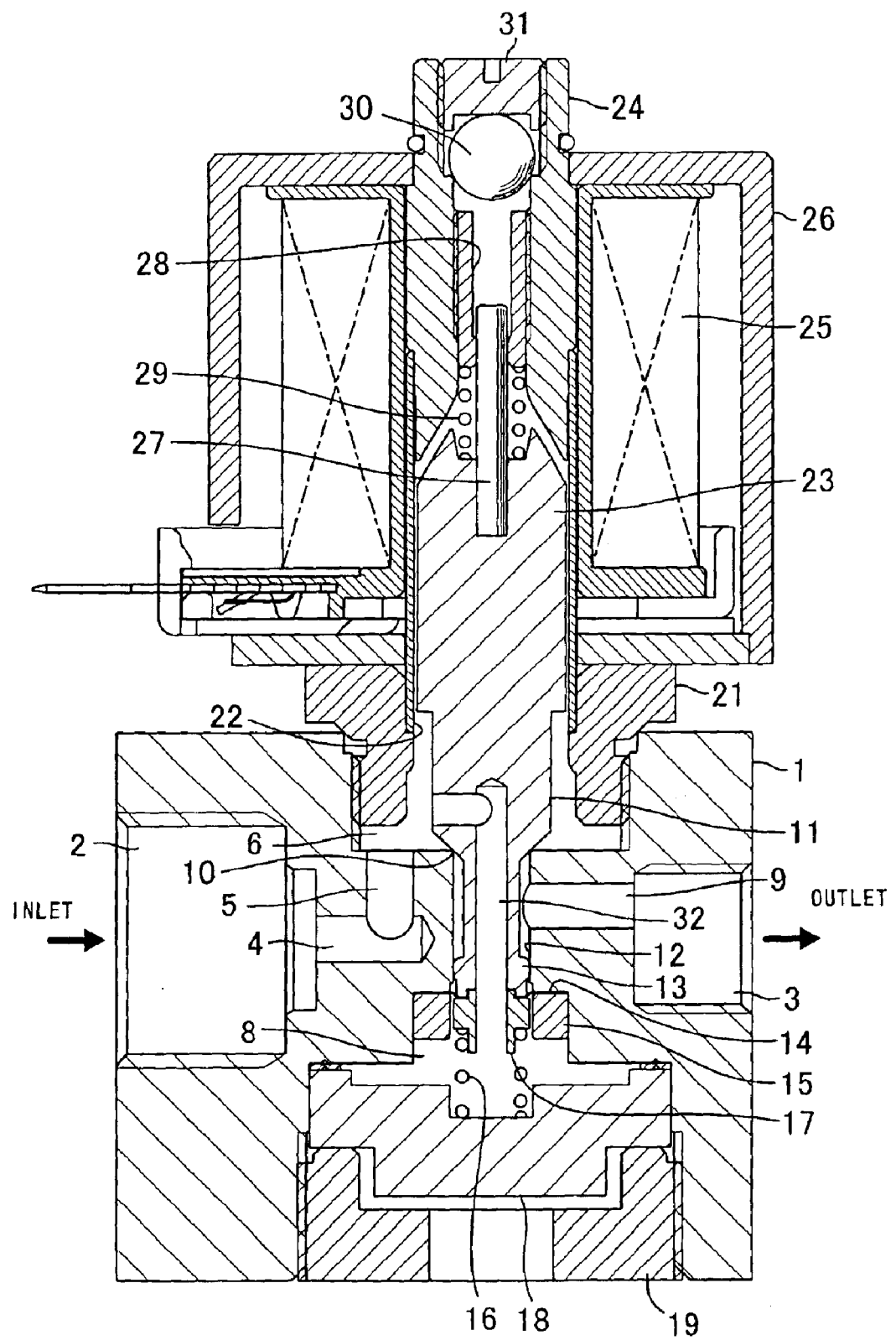
FIG. 5 is a longitudinal sectional view showing a de-energized state of a proportional valve according to a second embodiment.
Figure 6:
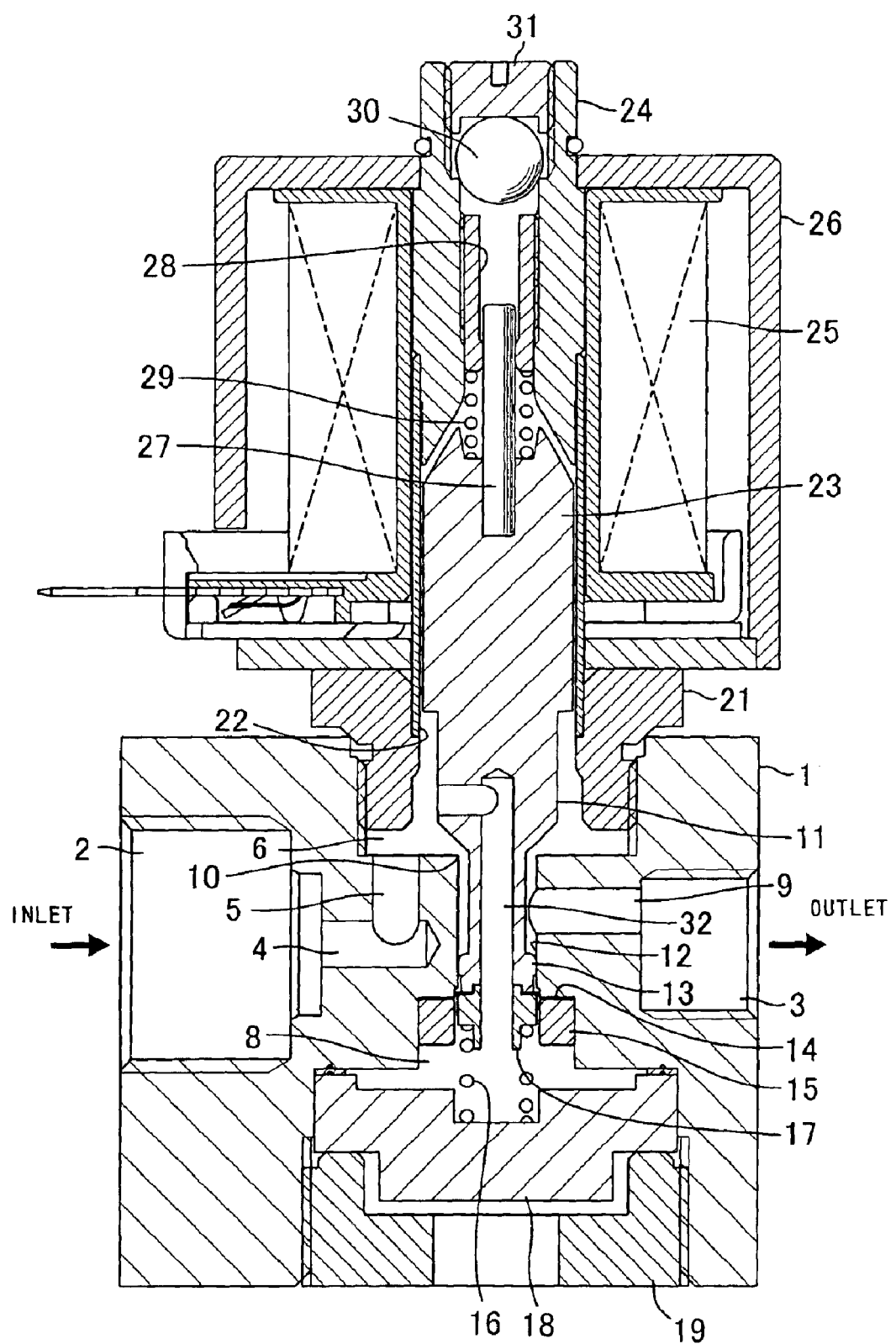
FIG. 6 is a longitudinal sectional view showing an energized state of the proportional valve of the second embodiment.

FIG. 5 is a longitudinal sectional view showing a de-energized state of a proportional valve according to a second embodiment, and FIG. 6 is a longitudinal sectional view showing an energized state of the proportional valve of the second embodiment. In FIGS. 5 and 6, identical reference numerals are used to denote elements having functions identical or similar to those of the elements appearing in FIGS. 1 and 4, and detailed description of such elements is omitted.

In the proportional valve of the first embodiment, the refrigerant is introduced into the second chamber 8 through the passage 7 formed in the body 1. By contrast, in the proportional valve according to the second embodiment, the refrigerant is introduced into the second chamber 8 through a passage 32 extending through the valve element 11, piston 13, diaphragm 14 and stopper 17.

Specifically, a lateral communication hole is formed in the valve element 11 in communication with the first chamber 6, and the passage 32 is formed so as to extend through the axis of the one-piece body constituted by the valve element 11, the piston 13, and the shaft connecting the valve element 11 and the piston 13. For the diaphragm 14, a doughnut-shaped diaphragm having a hole in its center is used. The diaphragm 14 has an outer peripheral portion clamped between the body 1 and the holder 15, and has an inner peripheral portion fixed by the stopper 17 having a hole formed along its axis and press-fitted in the lower end portion of the piston 13. Also in this case, the diaphragm 14 is mounted in a displaced state such that when the valve element 11 is seated on the valve seat 10 as shown in FIG. 2, the effective pressure-receiving area of the diaphragm is at a maximum and is equal to the effective pressure-receiving area of the valve element 11 seated on the valve seat 10.

In the proportional valve according to the second embodiment, the high-pressure refrigerant introduced into the inlet port 2 from the condenser or the gas cooler once enters the first chamber 6 and is then introduced into the second chamber 8 through the passage 32, whereby the pressures in the first and second chambers 6 and 8 are equalized. In other respects, the proportional valve operates in the same manner as that of the first embodiment, and when the electromagnetic coil 25 is supplied with a control current, the proportional valve is brought to a state shown in FIG. 6.

Figure 7:
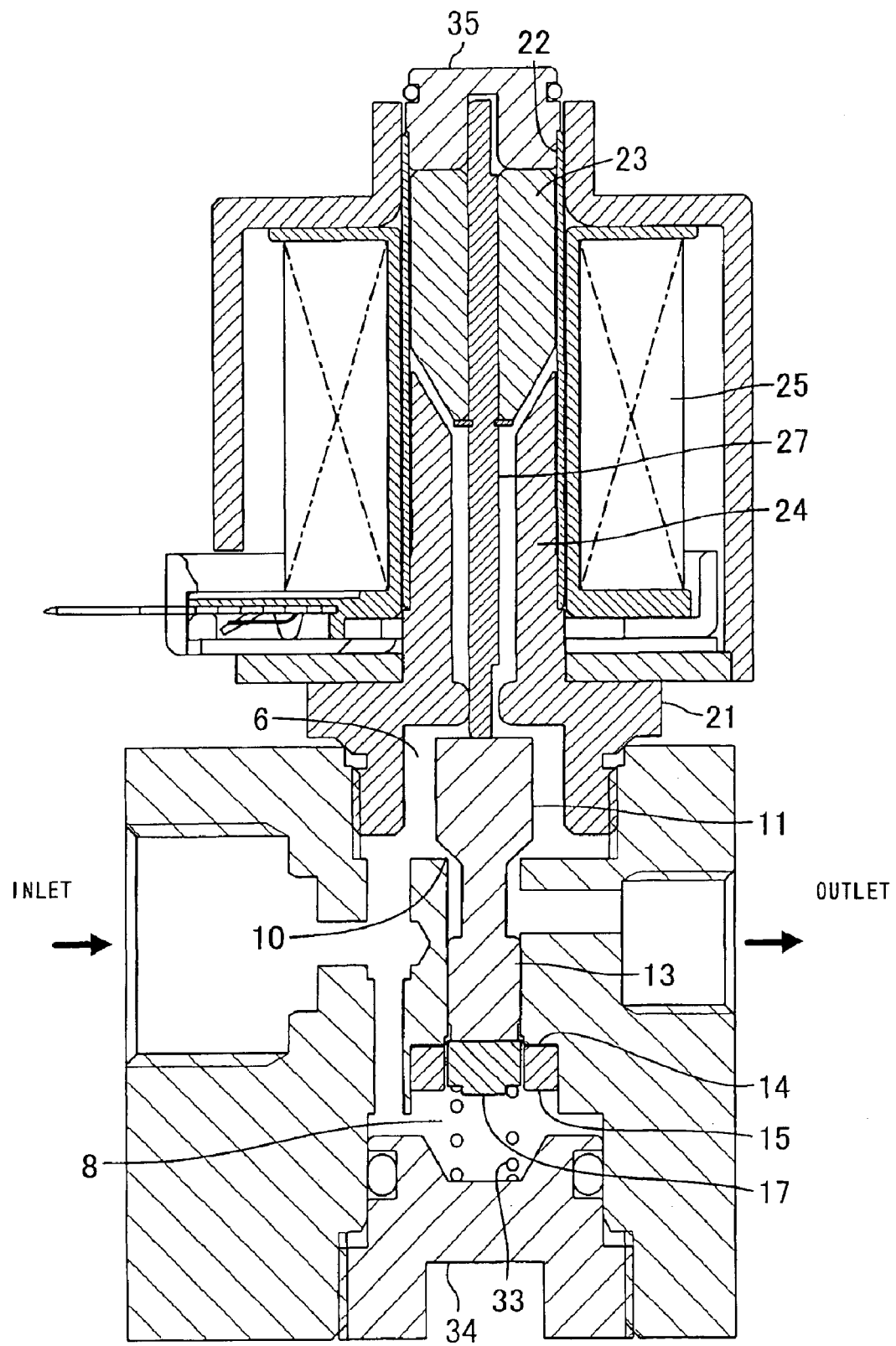
FIG. 7 is a longitudinal sectional view showing a de-energized state of a proportional valve according to a third embodiment.

FIG. 7 is a longitudinal sectional view showing a de-energized state of a proportional valve according to a third embodiment. In FIG. 7, identical reference numerals are used to denote elements having functions identical or similar to those of the elements appearing in FIGS. 1 and 4, and detailed description of such elements is omitted.

The proportional valves of the first and second embodiments are of a normally closed type which is fully closed when the solenoid is de-energized, while the proportional valve of the third embodiment is a normally open type which is fully open when the solenoid is de-energized.

The valve element 11 is formed integrally with the piston 13, thus constituting a one-piece body, and the pressure receiving portion of the piston 13 is configured in the same manner as that of the piston of the proportional valve of the first embodiment. The stopper 17 disposed in contact with the diaphragm 14 is urged in the valve opening direction by a spring 33 but receives no urging force from the solenoid when the solenoid is de-energized, so that the proportional valve remains fully open. The spring force of the spring 33 is adjusted by an adjusting screw 34 screwed into the body 1.

The diaphragm 14 is mounted in a displaced state such that when the valve element 11 is seated on the valve seat 10, the diaphragm 14 has the largest effective pressure-receiving area equal to the effective pressure-receiving area of the seated valve element 11, and that when the proportional valve is fully open as shown in FIG. 7, the diaphragm 14 has an effective pressure-receiving area corresponding to that of the valve element 11. Consequently, even if the refrigerant is introduced while the proportional valve is in the fully open state, the valve element 11 never closes by itself due to the refrigerant pressure.

Compared with the proportional valves of the first and second embodiments, the plunger 23 and core 24 of the solenoid are positioned inversely in the axial direction. The core 24 is formed integrally with the flange 21 for fixing the solenoid to the body 1, and the sleeve 22 is fixed to the core 24. Also, the core 24 has a hollow in a central portion thereof and has a lower end portion serving as a bearing for the shaft 27 to which the plunger 23 is fixed. An upper end portion of the shaft 27 is supported by a plug 35 closing an upper end of the sleeve 22. When the proportional valve is in the fully open state as shown in FIG. 7, the plunger 23 is urged against the plug 35 by the urging force of the spring 33, thereby limiting a maximum lift amount of the valve element 11.

Also in the proportional valve constructed as above, when the electromagnetic coil 25 is energized, the plunger 23 is attracted toward the core 24 for a distance corresponding to the value of current supplied to the coil 25, and the valve element 11 is correspondingly lowered by the shaft 27 against the urging force of the spring 33, whereby the proportional valve is brought to a state as shown in FIG. 4 with the valve lift set to a predetermined value. At this time, the refrigerant flows in the same manner as in the proportional valves of the first and second embodiments, and the pressure applied to the valve element 11 is canceled out by the pressure acting upon the diaphragm 14, so that the proportional valve of the third embodiment operates in the same manner as those of the foregoing embodiments.

As described above, the present invention has a construction such that change in the effective pressure-receiving area of the valve element corresponding to the lift amount thereof is canceled out by change in the effective pressure-receiving area of the diaphragm corresponding to the amount of displacement thereof. Since the pressures acting upon the valve element and the diaphragm are canceled out irrespective of the lift amount of the valve element, it is possible to prevent the proportional valve from opening or closing by itself due to the difference between the effective pressure-receiving areas, whereby the lift amount of the valve element can be controlled solely by the value of control current supplied to the solenoid.

Also, the diaphragm is arranged so as to perfectly seal the sliding portion of the piston. Thus, since no fluid leaks via the sliding portion, internal leakage can be completely prevented when the proportional valve is fully closed, making it possible to improve the controllability.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A proportional valve having a valve element whose lift amount varies in proportion to a current value, characterized by comprising:

a piston arranged on one side of a valve seat opposite the valve element and movable together with the valve element, the piston receiving a pressure equal to a fluid pressure applied to the valve element from an upstream side thereof in a valve closing direction, to urge the valve element in a valve opening direction; and a diaphragm arranged at a pressure receiving portion of the piston, for varying a pressure receiving area of the pressure receiving portion in accordance with the lift amount of the valve element.

2. The proportional valve according to claim 1, characterized in that when the valve element is in a seated position, the diaphragm is in a displaced state such that the pressure receiving area is at a maximum.

3. The proportional valve according to claim 1, characterized in that a chamber whose internal pressure acts upon the diaphragm communicates with an inlet port through a passage formed in a body.

4. The proportional valve according to claim 3, characterized in that the diaphragm has an outer peripheral portion secured to the body so as to seal a cylinder slidably receiving the piston.

5. The proportional valve according to claim 1, characterized in that a chamber whose internal pressure acts upon the diaphragm communicates with a chamber on an upstream side of the valve element, through a passage extending through the diaphragm and the valve element.

6. The proportional valve according to claim 5, characterized in that the diaphragm has an outer peripheral portion secured to a body so as to seal a portion slidably receiving the piston, and has an inner peripheral portion secured to the piston.

* * * * *